Oct. 18, 1966
E. SIMICH
3,279,050
MASH SEAM WELD METHOD
Filed Sept. 23, 1964
2 Sheets-Sheet 1
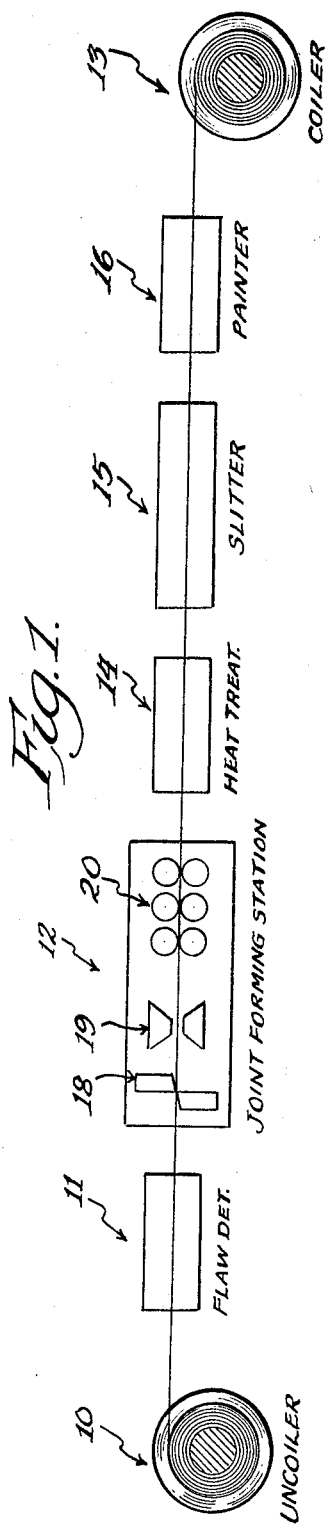
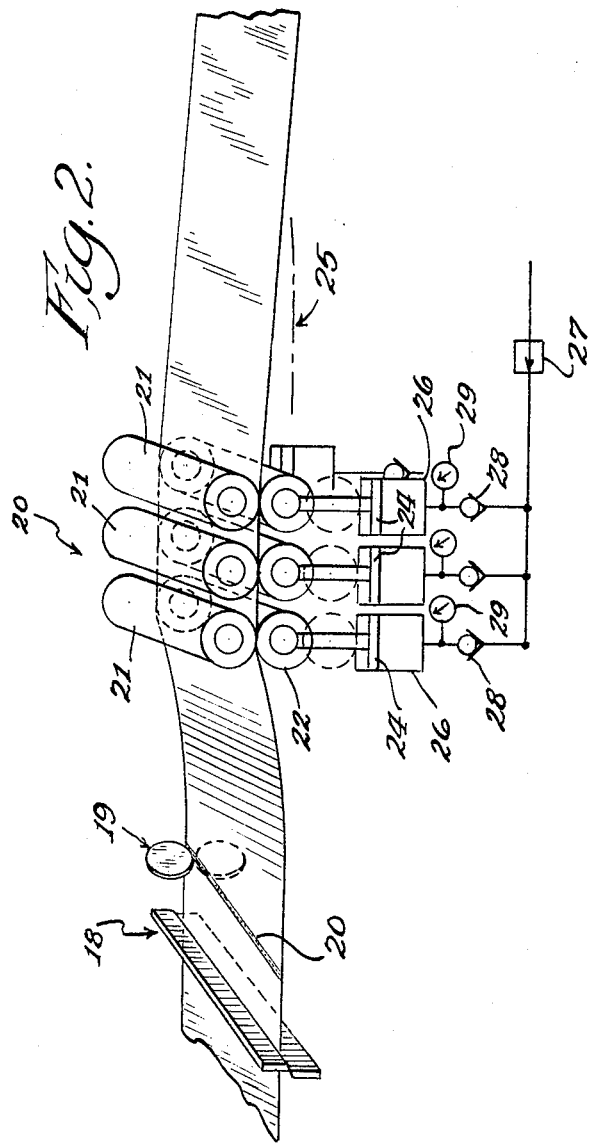
Inventor
Emil Simich
By William P. Porcelli
Atty.

Oct. 18, 1966     E. SIMICH     3,279,050

MASH SEAM WELD METHOD

Filed Sept. 23, 1964     2 Sheets-Sheet 2

Inventor
Emil Simich.
By William P. Porcelli
Atty.

United States Patent Office 3,279,050
Patented Oct. 18, 1966

3,279,050
MASH SEAM WELD METHOD
Emil Simich, Chicago, Ill., assignor to Interlake Iron Corporation, a corporation of New York
Filed Sept. 23, 1964, Ser. No. 398,614
4 Claims. (Cl. 29—480)

This invention relates to metallic strap process lines wherein a plurality of separate pieces of metallic strip stock are joined end-to-end to provide a single elongated strip and more particularly is concerned with effecting a high strength joint between each pair of trailing and leading ends of successive pieces of strip stock.

In a conventional process line for strip stock, it is usual to effect a mash seam weld in forming a joint between adjacent ends of strip stock, with the strip thereafter being heat treated and having excess weld removed. Certain difficulties have been encountered with known welding techniques. Among them is the problem of effecting a weld between the strip ends which is of the same metallurgical and physical characteristics as the main body of the strip, viz., of the same thickness, hardness or softness, or of the same internal crystalline structure. Difficulties are encountered in accurately flattening the weld to the exact thickness of the strip. Where the thickness is not the same, the weld is objectionable for later strip treatment as in a punch press. Also, it does not heat treat uniformly. The heat treat of the strip results in different physical and metallurgical properties at the weld so that the strip is not then uniform from end to end.

The principal object of this invention is the provision of a method and apparatus for effecting an improved weld between adjacent ends of a strip which weld becomes a substantially non-distinct portion of the main body of the strip with substantially identical thickness and other physical characteristics of the strip.

Another object of the invention is the provision of apparatus and methods applicable in a metallic strip process line for effecting weld joints equal or greater in strength to that of the strips which are joined.

Another object of the invention is the provision of apparatus and methods applicable in a metallic strip process line for providing weld joints along a direction that is oblique to the strip travel direction and for cold rolling the joint region along the direction of strip travel to reduce the material thickness thereof incrementally and achieve a substantially flat strip that is particularly suited to heat treating to uniform condition. The cold rolling in an oblique direction has the further advantage of minimizing the roll pressure required to therefore minimize power requirements and to prevent cold rolling of the strip proper.

A further object of the invention is the provision of a substantially flat elongated metallic strip comprised of a number of separate pieces of strip stock connected end-to-end by angle weld joints that are directed oblique to the line of the strip.

Other objects and advantages of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification and in which like numerals are employed to designate like parts throughout the same:

FIG. 1 is a diagrammatic illustration of a strip processing line in which the present invention finds important application;

FIG. 2 is an enlarged schematic perspective view of the welder station of the process line of FIG. 1 with the welder station incorporating the features of this invention;

Figure 3:
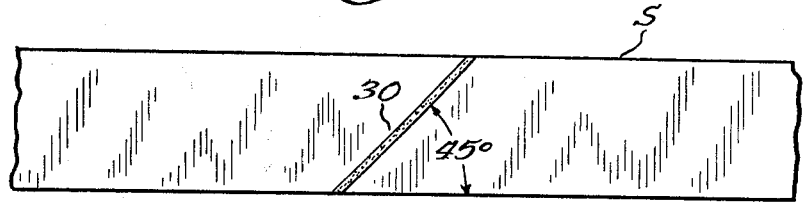
FIG. 3 is a fragmentary plan view illustrating a strip portion including a weld joint provided in accordance with the teachings of this invention.

Referring now to the drawings, and particularly to FIG. 1, there is illustrated a typical process line for forming a plurality of pieces of strip stock to provide a single elongated strip. The process line includes an uncoiler station 10 from which separate pieces of strip stock are successively paid out, with each such strip stock piece first being fed through a flaw detector unit 11 and then being fed to the joint forming station 12. Successive stock pieces are interconnected end-to-end at the joint forming station 12 to provide a single elongated strip which is then advanced endwise through the line for further processing and then finally is wound up at the coiler station 13. In the particular process line illustrated herein, there is also provided a heat treat station 14, a slitter station 15 and a paint station 16. It is contemplated that wide strip stock may be processed in this line. Thus the strip pieces are first joined, then heat treated and thereafter slit into a set of side-by-side strips which are separately wound at the coiler station 13.

As is diagrammatically illustrated in FIG. 2, the joint forming station includes means for shearing the trailing end of a lead piece of strip stock and the leading end of a trailing piece of strip stock and as represented here, the shearing means may comprise a pair of superposed shears 18 disposed along the process line to extend in a direction thereacross that is oblique to the strip travel direction; thus, the shears 18 sever each strip piece end along an edge line which is correspondingly oblique to the strip travel direction.

The joint forming station is also represented as including a mash seam welder for forming a seam welded joint between each pair of adjacent sheared strip piece ends. The welder is here represented as including a pair of superposed electric resistance welding wheels 19 disposed along the process line in flanking relation to the strip stock and conjointly movable across the strip stock in a direction that is aligned with the strip edges defined by the previously sheared strip ends. While not specifically shown herein, the welder conventionally will include means for arranging the sheared strip ends in overlapping relation to define a seam region 20 that extends correspondingly oblique to the travel direction of the strip. The seam region therefore is coincident with the path of the welding wheels 19 so that the movement of the wheels across the strip causes passage of welding current through linearly successive regions of the seam while applying pressure to the seam regions at right angles to the plane of the stock to form a completed weld joint along the seam that is of greater thickness than the original stock.

Finally, the joint forming station includes pinch roll facilities 21 for cold rolling the joint to effect reduction of its material thickness to that of the original stock, thereby providing a substantially flat elongated strip. The pinch roll facilities are here represented as three separate pairs of superposed planishing rolls disposed in immediately adjacent relation along the process line for effecting gradual reduction in the material thickness at the joint. Each pair of planishing rolls are arranged to span the full width of the strip and are mounted to rotate about transverse axes that are at right angles to the strip travel direction so that each pair of planishing rolls is enabled progressively to engage and reduce linearly successive incremental regions of the joint while adjacent regions of the strip stock serve as a gauge limiting the amount of reduction in material thickness at the joint. In the case of each pair of planishing rolls, the upper roll 21 is mounted on a stationary axis and is power driven by facilities which are not shown herein, whereas the lower roll 22 is an idler and is mounted from bearing supports 23 carried on vertically shiftable pistons 24. However, both the upper rolls 21 and the lower rolls 22 can be idlers or power driven. If they are idlers, the coiler 13 or other means must provide sufficient torsion to pull the strip through the passage between the rolls 21 and 22. In FIG. 2 the idler rolls 22 are shown in full lines in their operative positions wherein they are temporarily located above the elevation of the natural pass line 25 of the elongated strip and are actively impressing the strip upwardly against the power driven rolls 21. The inoperative lower position of the idler rolls 22 is shown in dotted lines in FIG. 2. The pistons 24 which control the elevation of the idler rolls 22 are operated in cylinders 26 which are fed under the control of a common valve 27 through three branch lines, each of which includes a pressure regulator 28 and a pressure gauge 29.

The operation at the joint forming station will now be more apparent. The pieces of strip stock are first sheared at their respective ends and overlapped to define a seam and the welding wheels are then actuated to effect welding and annealing in one sweep. The valve 27 is automatically responsive upon completion of the weld cycle to effect closing of the planishing rolls 21 and 22 which are then operative to run the strip at the line operating speed for a predetermined interval after which the planishing rolls are automatically disengaged under the control of the rolling valve.

Figure 4A:
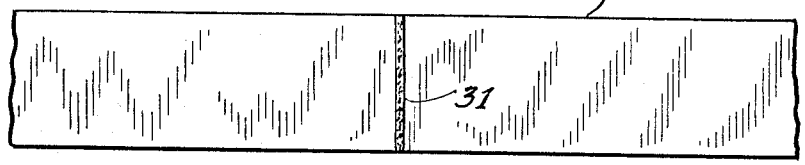
FIGS. 4A, 4B, and 4C are fragmentary plan views of strip sections that incorporate other weld joints.

A fragment of a completed strip S is shown in FIG. 3 wherein the oblique direction of the weld joint 30 is represented typically at a 45° angle. It should be noted that to obtain a prescribed pressure for reduction in joint thickness, much less loading of the planishing rolls is required with the 45° angle weld joint 30 of FIG. 3 as compared with a right angle weld joint 31 such as is shown in FIG. 4A because only a small increment of the angle weld joint is being rolled at a particular instant. Because only a short increment of the entire weld length is rolled at a time, the rolling pressure required is far less than that required to flatten the strip proper. The results are an economy of power requirements and no flattening of the strip proper. For example, on a 15¾" width strip about 3/16" increment of weld is being rolled, assuming 8" diameter planishing rolls. For a 5% material thickness reduction, this requires about 6,000 lbs. loading, whereas to cold roll across an entire strip width or weld length all at once would require about 427,000 lbs. These figures are based upon a 28,000 lbs. per lineal inch of width for 5% reduction and this relationship has been checked out and verified both experimentally and by calculation.

Since the actual force loading applied to the planishing rolls may be markedly reduced in the practice of the present invention, the strip stock is not reduced in thickness because of insufficient rolling pressure and it becomes effective to act as a gauge that limits the reduction in material thickness of the weld joint. By these procedures it therefore becomes practical to achieve a reduction of the joint thickness to substantially equal that of the stock thus providing a substantially flat strip throughout its entire length with the strip material being free of harmful effects either from the weld or from the cold rolling. If there is subsequent heat treating, especially by electric resistance heating at the heat treat station 14, the thickness of the weld joint being identical with that of the remainder of he strip permits achieving uniformity in the heat treatment of the strip and the weld. This characteristic of uniformity is important because where heat treating is applied to strips having joints of increased thickness, different metallurgical and physical properties result at the weld region. Any such condition of non- uniformity frequently causes difficulty when subsequently using the strip, for example, as in a punch press operation.

Figure 4B:
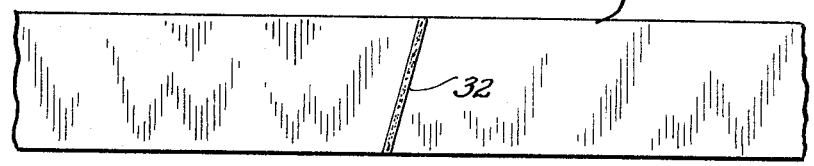
Figure 4C:
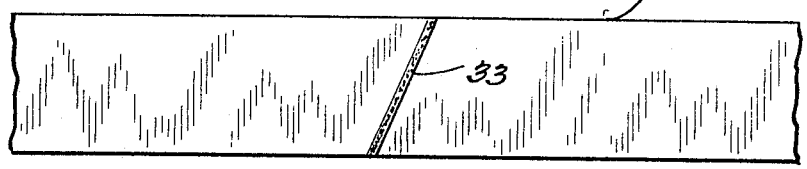

An improvement in the mash seam weld connected strips produced in accordance with the practice of this invention may be appreciated from a consideration of the results of tensile tests which were run on strip elements produced in a process line arrangement as illustrated in FIG. 1 wherein the line included electric resistance heat treating and subsequent slitting of a wide strip into a set of narrow strips. The steel employed was 10040 cold rolled 1¼" x .031" in cross-section, with an average ultimate tensile load of 4,912 lbs., corresponding to 152,000 p.s.i. In tensile tests of 26 strip samples having a 45° angle joint 30 as shown in FIG. 3, no weld failures occurred; only band breaks resulted; whereas in tensile tests run on 90° weld joints 31 as shown in FIG. 4A, or 75° weld joints 32 as shown in FIG. 4B, or even on 65° weld joints 33 as shown in FIG. 4C, the failure rate at the joints was on the order of 90%. Good results were also obtained from tests where the weld angle was less than 45°.

Thus, while preferred constructional features of the invention are embodied in the structure illustrated herein, it is to be understood that changes and variations may be made by those skilled in the art without departing from the spirit and scope of the appended claims.

What is claimed is:

1. In a line that successively processes a plurality of pieces of strip stock to provide a single elongated strip travelling in an endwise direction, a method for effecting a high strength joint between each pair of trailing and leading ends of successive pieces of strip stock consisting of shearing each end of each pair along a corresponding edge line oblique to such travel direction, forming a welded joint of greater material thickness than the strip stock between the sheared ends along the correspondingly obliquely oriented edge lines, and progressively rolling the welded joint along its length from end to end by rotating a cooperating pair of pinch rollers in full strip with spanning relation about axes located above and below the elongated strip in transversely extending relation to such direction with sufficient pinching pressure to engage and reduce linearly successive localized regions of the joint but with insufficient pinching pressure to reduce adjacent regions of the elongated stripe while employing said regions as a gauge contacted by the pinch rollers for the full strip width for limiting the amount of reduction in material thickness at the joint.

2. In a line for successively processing a plurality of pieces of strip stock to provide a single elongated strip travelling in an endwise direction, said line including facilities for heat treating the elongated strip, an improved method which consists in shearing both the trailing edge of a preceding strip and the leading edge of a succeeding strip along a corresponding line oblique to such travel direction, overlapping the sheared edges of the strip to provide a seam that extends oblique to such travel direction, progressively passing welding current through linearly successive portions of the seam while concurrently applying pressure to the seam portions at right angles to the plane of the stock to form a joint along said seam of greater thickness than the stock, and progressively rolling the joint along its length from end to end by rotating a cooperating pair of pinch rollers in full strip width spanning relation about axes extending transverse of such direction above and below the elongated strip with sufficient pinching pressure to engage and reduce linearly successive localized regions of the joint but with insufficient pinching pressure to reduce adjacent regions of the elongated strip while employing said regions as a gauge contacted by the pinch rollers for the full strip width for limiting the amount of reduction in material thickness at the joint.

3. The method of welding together two flat metal strip portions comprising abutting the two strip portions along adjacent strip edges, forming a welded joint at the adjacent strip edges, and progressively rolling the welded joint along its length from end to end with sufficient rolling pressure to flatten only an increment of the welded joint while employing the strip portions as a gauge to limit the flattening of the welded joint to the thickness of the strip portions.

4. The method of welding together the trailing end and the leading end, respectively, of two elongated flat metal strips, comprising, shearing both ends along lines oblique to the direction of the lengths of the strips, abutting the sheared ends and forming a welded joint between them, and progressively compressing the welded joint along its length from end to end with sufficient compression to flatten only an increment of the welded joint while employing the strip portions adjacent to the welded joint as a gauge to limit compression of the welded joint to the dimension of the thickness of said strip portions.

References Cited by the Examiner
UNITED STATES PATENTS

| | | |
|---|---|---|
| 2,175,616 | 10/1939 | Reed. |
| 2,344,534 | 3/1944 | Buchnam. |
| 2,394,466 | 2/1946 | Muddiman _____ 266—3 |
| 2,911,515 | 11/1959 | Cooper. |

CHARLIE T. MOON, *Primary Examiner.*

WHITMORE A. WILTZ, *Examiner.*

M. L. FAIGUS, *Assistant Examiner.*